Jan. 19, 1954   L. W. GACKI ET AL   2,666,855
X-RAY FILM CASSETTE
Filed May 21, 1952   2 Sheets-Sheet 1

L.W. GACKI &
W.A. WINFIELD
INVENTOR.

BY L. S. Smithers
ATTORNEY

Jan. 19, 1954   L. W. GACKI ET AL   2,666,855
X-RAY FILM CASSETTE

Filed May 21, 1952   2 Sheets-Sheet 2

L. W. GACKI &
W. A. WINFIELD
INVENTOR.

BY L. T. Smithers
ATTORNEY

Patented Jan. 19, 1954

2,666,855

UNITED STATES PATENT OFFICE 2,666,855

X-RAY FILM CASSETTE

Leonard W. Gacki, Jamaica, and Walter A. Winfield, Bronx, N. Y., assignors to Xray Instrument Corporation, a corporation of New York Application May 21, 1952, Serial No. 289,068

6 Claims. (Cl. 250—68)

This invention relates to X-ray photography and specifically to an improved form of cassette or holder for supporting screens and other X-ray sensitive materials useful in the art.

A prerequisite of any X-ray film or plate cassette is the ability to maintain perfect contact between the fluorescent screens and the sensitive plate. For optimum results the faces of these elements must be pressed into contact at every image recording area during an exposure, otherwise the diffusion of the rays at points of undesired separation will cause the image to spread and blur with resulting loss of essential detail in the picture. Strength and rigidity of the frame and the frame supporting members are, of course, necessary for the compact sealing of these critical surfaces in light-tight, non-sliding relationship within the cassette. Equally important is the particular arrangement of parts functioning to distribute evenly the pressures applied to bring the X-ray recording members into correct working position.

Any weakening of the main frame support, as by the removal or cutting away of the frame walls for the attachment of hinges, will jeopardize the operation of the device. Cutting away portions of the frame is, nevertheless, common practice in many present day cassette structures. Frequently additional portions of the side walls are left unsupported to provide for the forceful insertion and restraint of swiveling latch members conventionally applied to distribute the pressures referred to previously.

It is accordingly an object of the present invention to provide an X-ray cassette having a frame of sufficient sturdiness to support essential moving parts while maintaining the critical location and contact of sensitive recording materials.

It is likewise an object of the invention to provide a cassette frame which is better adapted to the use of an economical hinge without requiring the removal of essential frame wall surfaces to permit the unobstructed operation of the hinges and cover clamps.

Another important object of the invention is the provision of means for bracing the cassette frame at several critical locations so as to lend the utmost stability and strength to the support and contact of the picture transmitting elements.

Other important objects, advantages and inherently improved functions of the invention will be apparent from a detailed study of the description and drawings disclosing the preferred embodiments thereof.

Figure 1:
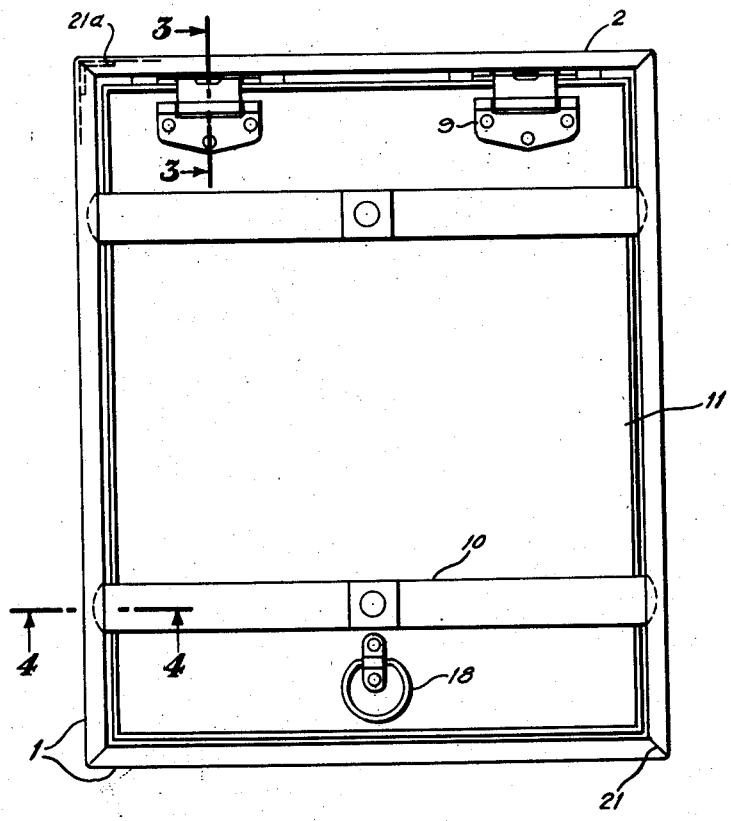
Fig. 1 is a plan view of the completely assembled cassette showing the hinged cover clamped in closed position.
Figure 3:
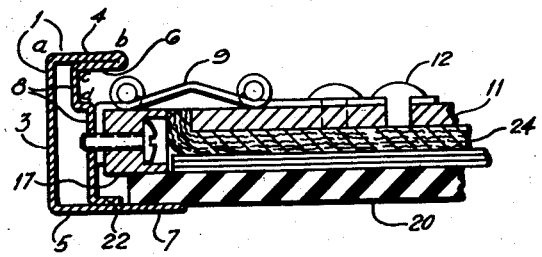
Fig. 3 is a cross section through line 3—3 of Fig. 1, showing another form of the invention.

As shown in Figs. 1 and 3, the cassette of the invention comprises a hollow, girderlike frame 1, generally rectangular in cross section, that may be a unitary structure but is preferably composed of four identical frame sections 2, mitered and reinforced internally at the corners 21 by angle pieces 21a, indicated in shadow detail in Fig. 1, slidingly insertable within each section. Each frame piece, preferably, is a unit metal stamping bent to form a hollow rectangle having vertical outside wall 3, top wall 4, bottom wall 5, extending to form flanges 6 and 7, and reentrant, vertical inner walls 8, the latter being contoured to provide clearance for the unobstructed movement of triple plate hinges 9, and the top wall for the insertion of the compressible ends of swiveling, resilient cover clamps 10. A cover 11 is attached to one flange of the hinge, as by roundhead rivets 12, the cover being under constant tension of a spring 13, wound upon axle member 14, the ends of the spring being restrained under tension by plates 15 and 16, of the hinge.

The hinge is thus a self-contained unit comprising three pivotable plates, two of which are spring urged, the third untensioned member being attached to the cover. In assembling the cassette, one of the tensioned hinge plates 15 is interposed between the inner frame wall section 8, and the plate retainer 17 or 30, where it is fixed and supported in a manner to be described. It should be noted that this particular form of hinge provides a continuous upward pressure upon the cover, the effect of which is first, upon release of the resilient cover clamps, to force the cover vertically away from the frame with as little as possible disturbance laterally of the materials stacked within the frame, then, responding to the continuing tension of the spring, to move the cover arcuately until the spring tension is overcome by the weight of the cover, after which, the opening of the cover may be completed by hand. To facilitate opening and closing, a handle 18 may be attached in any suitable manner to the cover.

A cassette or holder of the type under consideration is customarily loaded in a darkroom. Sensitized plates or films, screens and light excluding materials are conventionally stacked in suitable layers upon an outer plate 20, of suitable, X-ray permeable material, usually Bakelite. Due to its low coefficient of expansion and because of the comparatively soothing effect upon the person of a patient reclining upon the exposed side of the plate, Bakelite or an acceptable form of plastic material is considered more desirable than metal. It will be understood that the particular arrangement of the fluorographic and sensitized elements, light excluding materials etc., within the cassette frame forms no part of the present invention but that the precise arrangement of the apparatus serving to maintain these parts in non-sliding, face to face contact, is the feature toward which the invention is specifically directed.

The particular configuration of the girder frame is an essential characteristic of the invention. As shown in Fig. 3, the base wall 5, and the outer wall 3, of the frame are conventionally contoured. The top wall 4, however, is folded or overlapped upon itself to form a doubled thickness for a portion of its total extent between top wall extremities a and b. At locations c and d, the frame is bent at right angles to form clearance space cd, wherein the hinge is free to swing, and bent again to form protruding inner wall sections 8, to which the hinge may be attached without having to weaken the wall by cutting away any part of its essential supporting surface. The top fold or overlap may be clinched or otherwise tightly forced together as shown, to provide additional rigidity. The fold 6 of the frame top serves a very useful and unique purpose in that it provides extra resistance to bending stresses introduced by the necessarily forceful insertion of the resilient latch members 10, when these members are pivoted or swiveled to clamp the cover in closed position. The use of latches for this purpose is an old expedient which serves to distribute the applied pressure evenly over the functioning elements within the frame. In many cassettes designed heretofore, it has been necessary to remove a portion of the wall frame to provide for the insertion of these latches. In the present invention, however, this is not necessary. The double thickness of the frame top provides excellent reinforcement. Nowhere is the frame wall itself broken away for clearance or attachment of hinges, clamps or cover. Furthermore, the rounded over edge of the fold leaves no sharp protrusions likely to injure a patient or the person handling the cassette.

When the frame is made up of separate sections, it is preferably welded at mitered joints 21, Fig. 1, and along the base line 22, as shown in Fig. 3, where the inner wall is permanently secured to the base or lower flange of the frame. This lower flange conventionally supports the Bakelite plate. A small clearance space is provided between the plate and the end of the inner frame wall welded to the base. A stringpiece or retainer 17 rests upon the upper surface of the plate, clamping it firmly against the lower flange and providing firm, adequate restraint for the hinge against the protruding section of the inner frame wall when the stringpiece and the hinge are fixed to the wall by screws 23. A slight clearance is generally desirable between the cover and the stringpiece to permit the insertion of felt or other light excluding material 24.

Figure 2:
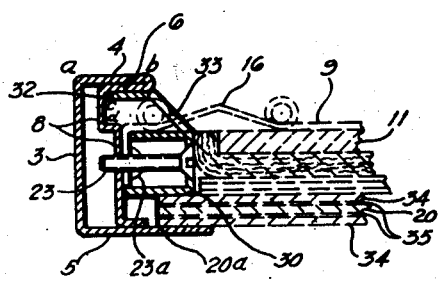
Fig. 2 is a cross sectional view of the frame, hinge, cover and supporting plate of one form of the invention showing also a novel form of plate retainer.

In Fig. 2, a form of cassette frame having a novel support member 30 is shown. In other respects, this embodiment is similar to the structure shown in Fig. 3. The retainer 30 may be an angle, channel or other suitable structure which will provide the critical degree of stiffness and resiliency necessary to render it suitable for dual service as a support for the frame top and as a clamp for the plate and the hinge. As indicated in the drawing, Fig. 6, we have preferred to show an irregular, U channel member, one arm (31) of which is braced against the surface of the plate 20, the other arm (32) being pressed beneath the under portion of the fold in the top wall frame 4. The U channel thus forms a resilient support or brace between the top of the frame and the plate, which, when tensioned by the insertion of screws 23, as previously indicated, braces the plate rigidly against the under side of the top frame wall and clamps the hinge 9 firmly against the side wall 8. The fixture of the hinge to the frame wall may be further reinforced by the insertion of screws 23a. In the manner described, support intermediate the extremities of the frame top is applied at several critical points. It should be noted also that the end 32 of the channeled member may abut the inner wall of the frame at a point directly beneath the bend at point c, thus lending support at still another location in the frame structure.

Figure 4:
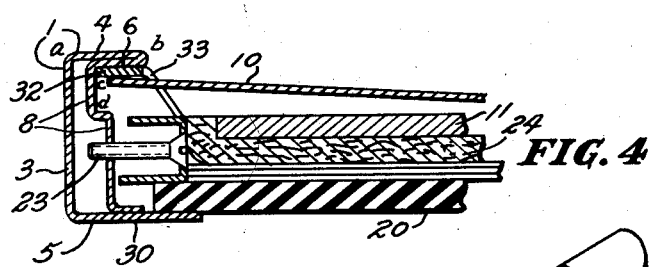
Fig. 4 is a cross sectional view of the frame, cover and swivelling latch member through line 4—4 of Fig. 1.
Figure 5:
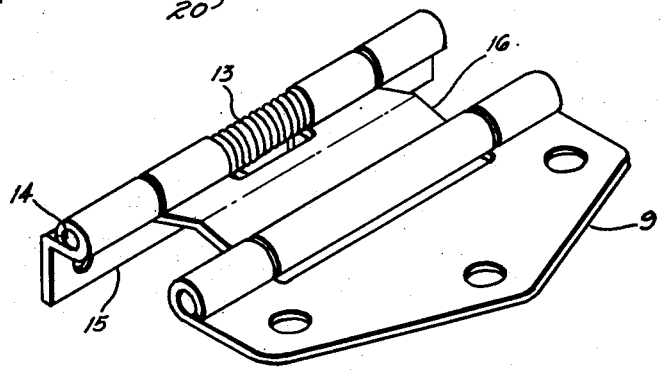
Fig. 5 is a detail view of a completely assembled, double jointed hinge useful in the preferred form of the invention.

In Fig. 4, the method of placement of the swivelling latch members 10, previously described, is shown. The folded top wall structure provides for the smooth, uninterrupted entry of the depressed ends of these members directly beneath the folded flange or, if channeled retaining members are used, as shown in the figure, the ends of the latches may be inserted through the cutout portion of the retainer channel and will serve as further reinforcement of both the channel and the folded top wall flange. It will be observed that with or without the channeled retainers, the swiveling latch members may be positioned and held firmly in cover clamping position requiring removal of no part of the frame wall.

Figure 6:
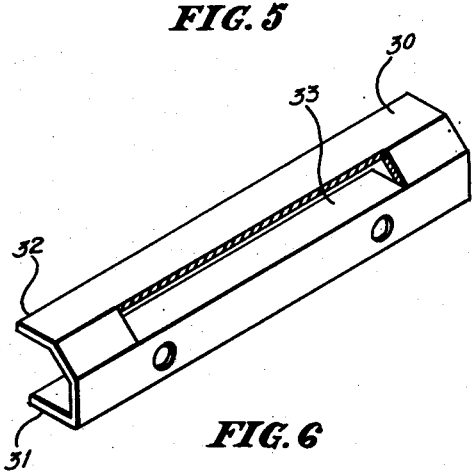
Fig. 6 is a view of the plate retainer of Fig. 2 in greater detail.

Fig. 6 shows the channeled retaining member 30 in greater detail. The retainer may extend along the full length of the inner frame wall or it may comprise a number of separate elements suitably spaced longitudinally of the frame to provide the necessary support without interfering with the operating parts of the hinges. If necessary, the separate retainers may be recessed as at 33, to provide clearance for the hinges or for the insertion of the cover latches described previously. By this construction, break through of the frame wall is avoided, the essential rigidity of the frame wall is maintained at all points, and clearance for the free movement of working parts is assured.

It should be emphasized that the use of resilient retainers is a novel replacement for the conventional molding such as is customarily used in many types of window frames as well as in X-ray cassettes, because it eliminates an expensive machining operation on the molding member, which, in X-ray cassettes is generally of relatively expensive metal such as aluminum, difficult to procure in times of scarce materials. The resilient retainer is considerably lighter in weight and may be formed by stamping.

It is well known in the art that Bakelite, while eminently satisfactory in many respects as a cassette plate material, in time will warp and introduce complications in the placement of screens and film within the frame. By the laminated plate structure of the present invention, as shown in Fig. 2, the tendency to warp is greatly reduced if not entirely eliminated. The laminations may comprise alternate layers of Bakelite 34, and aluminum or other metal 35, firmly compressed and held together by a suitable cementing agency. As a further precaution against warpage, the ends of a Bakelite or plastic plate may be treated with a suitable moisture-proofing material. In this manner a more dependable support for the sensitive materials encased within the frame is made available.

Having described the structure and function of the apparatus of the invention, what is claimed as novel is enumerated in the following claims:

1. An X-ray film cassette comprising a plate supported X-ray sensitive materials; a retainer for the plate; a hinge supported cover; a hollow girder frame having a base flange and a top flange, an extension of the top flange bent to form a vertical support intermediate the extremities of the top of the frame; and means fixing together the hinge, the retainer and said frame.

2. A film cassette for X-ray sensitive materials comprising a supporting plate; a retainer for the plate; a cover; a hinge supporting the cover; a frame having walls extended to form a plate supporting flange and a plate bracing flange, the plate bracing flange being formed by a clinched fold of the top wall, the folded portion being extended perpendicularly of the fold to form a vertical upper wall section supporting the top wall intermediate its extremities, and a lower wall section projecting inwardly of said supporting wall section; and means fixing together the hinge, the retainer and said inwardly projecting wall section.

3. A cassette for X-ray sensitive materials comprising a plate pervious to X-rays; a resilient retainer for the plate; a cover; a frame having a plate supporting base flange and a top flange; and means fixing the retainer to the frame, the application of said fixing means simultaneously tensioning the retainer between the top flange and said plate.

4. A cassette for X-ray sensitive materials comprising a plate pervious to X-rays; a resilient, perforated channel member; a cover; a hinge supporting the cover; a frame piece having a plate supporting base flange and a top flange extending respectively from bottom and top walls of the frame and having vertical inner and outer walls, the inner wall being bent to form a recess below the top flange but above the top of said plate on said base flange; and means fixing the channeled member to the frame.

5. An X-ray cassette comprising a generally rectangular, recessed, hollow girder frame having upper and lower flanges, the top of the frame being supported by a vertical extension of the top flange; a laminated plate supported by one of the flanges and braced against the other flange by a channeled, resilient, perforated, retaining member; a double jointed hinge having three pivoted plates, one of said plates being fixedly insertable between the frame and said retaining member; a cover fixed to another plate of the hinge and resilient means tensioned on the hinge and extending through a perforation of the retainer to continually urge said cover toward open position.

6. A holder for X-ray sensitive materials comprising a generally rectangular, hollow, flanged frame having a top wall extended to form a plate bracing flange, said top wall being supported by a vertical prolongation of said bracing flange; a vertical outside wall, a re-entrant inner wall; a base wall extended to form a plate supporting flange; a laminated plate supported by said base flange; a plate retainer bracing the plate against the first mentioned flange; a double acting spring hinge having a plate detachably mounted between the retainer and an inwardly extending, vertical face of the re-entrant wall; a cover continually urged toward open position by the hinge spring; and resilient members maintained in cover clamping position by contact with the underside of said top flange.

LEONARD W. GACKI.
WALTER A. WINFIELD.

References Cited in the file of this patent

UNITED STATES PATENTS

| Number | Name | Date |
|---|---|---|
| 2,161,058 | Kamiss | June 6, 1939 |
| 2,539,254 | Kamiss | Jan. 23, 1951 |